United States Patent
Jin et al.

(10) Patent No.: US 7,933,322 B2
(45) Date of Patent: Apr. 26, 2011

(54) TIMING LOCK DETECTION APPARATUS AND METHOD FOR DIGITAL BROADCASTING RECEIVER

(75) Inventors: Eun-Seok Jin, Daejon (KR); O-Hyung Kwon, Daejon (KR); Soo-In Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1076 days.

(21) Appl. No.: 11/635,721

(22) Filed: Dec. 7, 2006

(65) Prior Publication Data
US 2007/0133667 A1 Jun. 14, 2007

(30) Foreign Application Priority Data

Dec. 8, 2005 (KR) .................. 10-2005-0119958
Sep. 21, 2006 (KR) .................. 10-2006-0091982

(51) Int. Cl.
*H04B 3/46* (2006.01)

(52) U.S. Cl. ........ 375/226; 375/316; 375/285; 375/354; 375/357; 375/371; 702/69; 702/71; 702/72; 702/79

(58) Field of Classification Search .............. 375/226, 375/316, 285, 354, 357, 371; 702/69, 71, 702/72, 79
See application file for complete search history.

(56) References Cited

U.S. PATENT DOCUMENTS

| | | | |
|---|---|---|---|
| 6,696,886 B1 * | 2/2004 | Ke et al. | 327/553 |
| 6,757,024 B2 * | 6/2004 | Lee | 348/512 |
| 7,440,528 B2 * | 10/2008 | Lee | 375/354 |
| 2004/0202271 A1 * | 10/2004 | Fahim | 375/376 |

FOREIGN PATENT DOCUMENTS

| | | |
|---|---|---|
| KR | 10-2000-0020597 | 4/2000 |
| KR | 10-2001-0068618 | 7/2001 |
| KR | 10-2005-0033306 A | 4/2005 |
| KR | 10-2005-0052785 | 6/2005 |

* cited by examiner

*Primary Examiner* — Chieh M Fan
*Assistant Examiner* — Siu M Lee
(74) *Attorney, Agent, or Firm* — Blakely, Sokoloff, Taylor & Zafman LLP (57) ABSTRACT

A timing lock detection apparatus and method for digital broadcasting receiver are provided. The apparatus includes: a discrete value generator for cyclically selecting a discrete signal value from a continuous timing error signal; a differential calculator for obtaining a difference between the currently selected timing error signal value and a previously selected timing error signal that is a timing jitter signal; a sign variation detector for detecting variation in a sign of the timing jitter signal; a lock control signal generator for discriminating a period based on the detected sign changing time, and controlling a lock step of the loop filter according to a convergence mode of the timing jitter signal at each period; and a lock detection signal generator for generating a lock signal or an unlock signal according to whether the timing jitter signal reaches a steady state and using the current lock step signal.

11 Claims, 9 Drawing Sheets

TIMING LOCK DETECTION APPARATUS AND METHOD FOR DIGITAL BROADCASTING RECEIVER

FIELD OF THE INVENTION

The present invention relates to a timing lock detection apparatus and method for digital broadcasting receiver; and, more particularly, to a timing lock detection apparatus and method for a digital broadcasting receiver, which reduces abruptly hardware complexity, prevents a lock detection error, and quickly and accurately obtains convergence properties using a difference of timing error signals (ΔTiming_error) outputted from a loop filter of a symbol timing recovery unit to determine a converging level, that is a timing jitter signal.

DESCRIPTION OF RELATED ARTS

Figure 1:
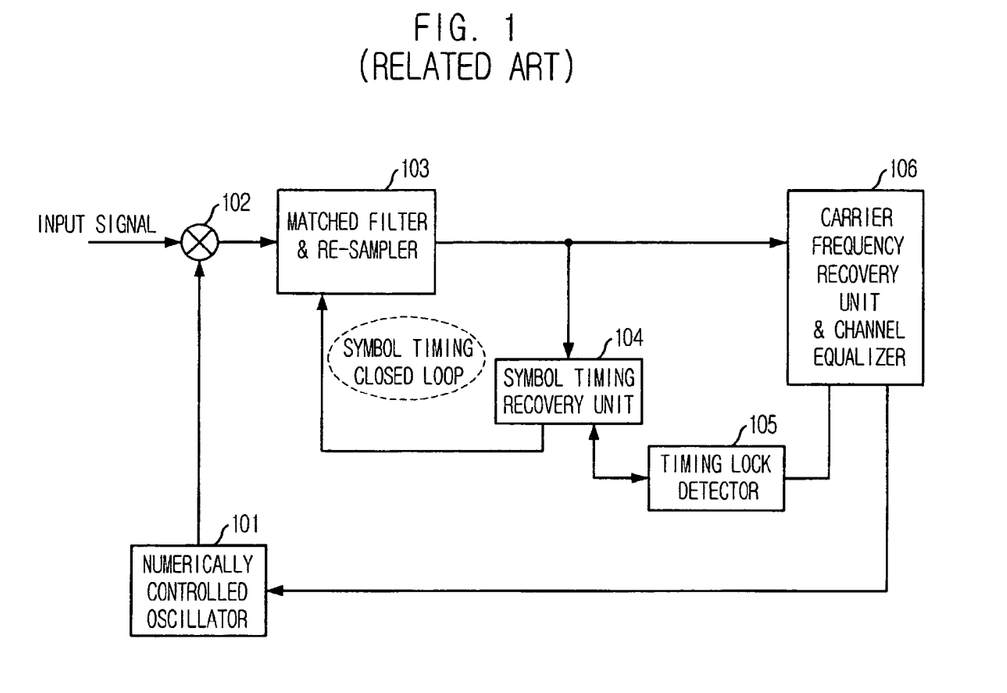
FIG. 1 is a block diagram illustrating a QAM demodulator including a convention timing lock detector.

FIG. 1 is a block diagram illustrating a QAM demodulator including a convention timing lock detector.

A quadrature amplitude modulation (QAM) is selected as a standard of a transmission method of a digital TV cable channel. A digital QAM demodulator employing such a QAM includes a numerically controlled oscillator (NCO) 101, a multiplier 102, a matched filter & re-sampler 103, a symbol timing recovery unit 104, a timing lock detector 105 and a carrier frequency recovery unit & channel equalizer 106.

The multiplier 102 multiplies an input signal to a signal of a predetermined frequency outputted from the numerically controlled oscillator (NCO) 101, and outputs a baseband signal. Then, the matched filter & re-sampler 103 receives the baseband signal outputted from the multiplier 102 and performs a matched filtering and re-sampling process on the received baseband signal. The carrier frequency recovery unit & channel equalizer 106 corrects the carrier frequency error and the effects of the channel of a signal outputted from the matched filter & re-sampler 103.

The symbol timing recovery unit 104 correctly estimates a symbol timing error from an input signal from the matched filter & re-sampler 103. The NCO 101 outputs a frequency signal that allows an accurate baseband signal to be obtained using the detected error from the carrier frequency recovery unit & channel equalizer 106. The timing lock detector 105 detects the converging state of the symbol timing recovery unit 104.

Hereinafter, the symbol timing recovery unit 104 will be described in detail.

Since the symbol timing recovery unit 104 is generally disposed in front of the carrier frequency recovery unit & channel equalizer 106 and transfers synchronized symbol data, the convergence property of the symbol timing recovery unit influences that of the carrier frequency recovery unit & channel equalizer 106. The convergence property of the symbol timing recovery unit 104 is very important in a view of the performance of the receiver. Preferable convergence property is a small timing jitter property in a fast synch acquisition state and steady state.

The timing recovery closed loop used in the symbol timing recovery unit 104 is a digital phase locked loop that has a convergence property varying according to a loop bandwidth. That is, if the bandwidth of the loop becomes wider, the synch acquisition time becomes shortened, and the timing jitter at the steady state becomes larger. On the contrary, if the bandwidth of the loop becomes narrower, the timing jitter becomes smaller in the steady state, and the synch acquisition time becomes slower. Therefore, in order to obtain a fast sync acquisition time and a small timing jitter in a steady state through the symbol timing closed loop, a timing recovery is acquired with a wider loop bandwidth at an initial stage, and the loop bandwidth is gradually narrowed using a timing lock detector when it converged to a steady state. Such a method is called a gear shifting.

Figure 2A:
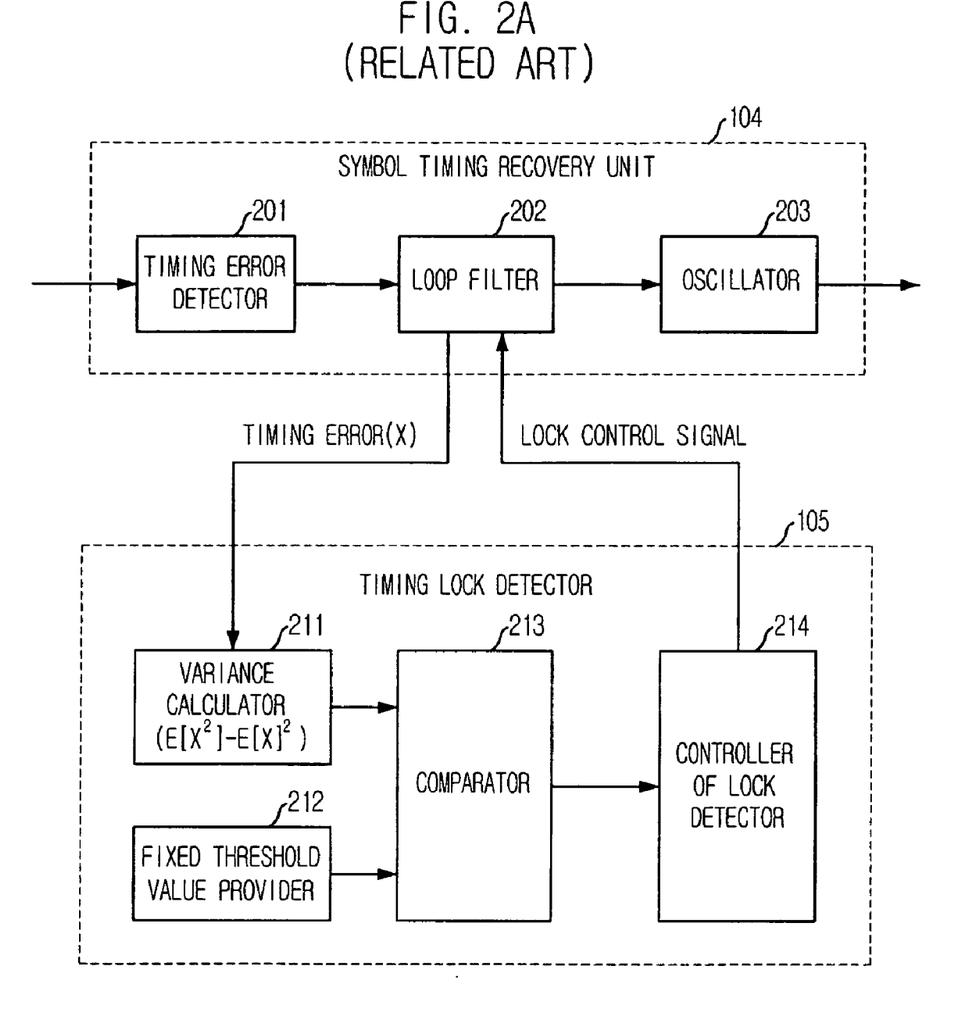
FIGS. 2A and 2B are block diagrams illustrating conventional timing lock detector.
Figure 2B:
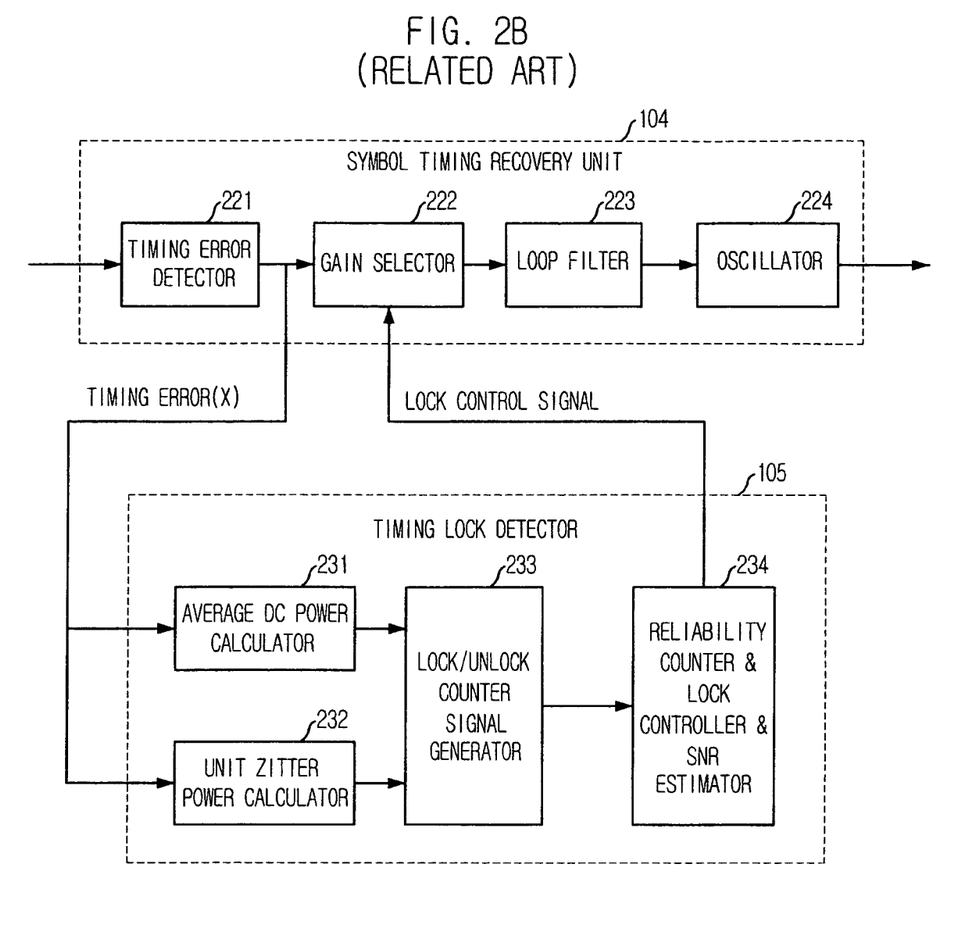

FIGS. 2A and 2B are block diagrams illustrating conventional timing lock detector. FIG. 2A shows a conventional timing lock detector, and FIG. 2B shows a recently introduced timing lock detector.

At first, the conventional timing lock detector will be described with reference to FIG. 2A.

The symbol timing recovery unit 104 includes a timing error detector 201, a loop filter 202, and an oscillator 203. The timing lock detector 105 includes a variance calculator 211, a fixed threshold value provider 212, a comparator 213, and a controller of lock detector 214.

The baseband signal inputted to the symbol timing recovery unit 104 is inputted to the timing error detector 201 of the symbol timing recovery unit. The calculated error from the timing error detector 201 is inputted to an integrator of the loop filter 202. The integrator of the loop filter 202 accumulates inputted error values and controls the oscillator 203 according to its accumulated value, thereby recovering the symbol timing. Herein, since the loop bandwidth of the timing recovery closed loop is in proportional to the gain of the loop filter 202 in the symbol timing recovery unit, the gain of the loop filter is controlled using the timing lock detector 105, thereby controlling the loop bandwidth.

The variance calculator 211 of the timing lock detector connected to the loop filter 202 calculates a variance of a timing error value X accumulated at the integrator of the loop filter 202. Then, the comparator 213 compares the variance from the variance calculator 211 with a fixed threshold value provided from the fixed threshold provider 212, and determines a lock time based on the comparison result. After determining, the comparator 213 transfers the determination result to the lock controller 214. The lock controller 214 creates the lock control signal (Lock-step) and transfers the created lock control signal to the loop filter 202.

The variance of timing errors accumulated at the integrator of the loop filter 202 varies according to a remained timing jitter property that is in reverse proportional to a channel state, e.g., signal to noise ratio (SNR) after convergence based on the channel state.

The conventional timing lock detector shown in FIG. 2A has problems in which the cost of hardware for variance calculation is very high, and a fixed threshold can generate a incorrect lock signal because a variance after convergence can vary according to a channel state, thereby occurring a lock detection error. Such a lock detection error not only extends the converging time but also makes the convergence impossible for a large timing frequency and phase offset.

Hereinafter, another conventional timing lock detector shown in FIG. 2B will be described.

As shown in FIG. 2B, a symbol timing recovery unit 104 includes a timing error detector 221, a gain selector 222, a loop filter 223 and an oscillator 224. The timing lock detector 105 includes an average DC power calculator 231, a unit jitter power calculator 232, a lock/unlock count signal generator 233, a reliability counter and lock control and SNR estimator 234.

Dislike from the conventional timing lock detector shown in FIG. 2A, the conventional timing lock detector of FIG. 2B directly receives a timing error generated at every symbols from the timing error detector 221 instead of receiving the accumulated error value from the integrator of the loop filter 203.

The average DC power calculator 231 receives a timing error, accumulates the received timing errors for a predetermined integration period, divides the accumulated timing errors by the integration period, and squares the dividing result, thereby calculating an average DC power. The unit jitter power calculator 232 receives the timing error, squares the received timing error, accumulates the squaring results for a predetermined integration period, and divides the accumulating result by the predetermined integration period, thereby calculating a unit jitter power.

The lock/unlock counter signal generator 233 receives and compares the average DC power with the unit jitter power, and generates a lock/unlock counter signal based on the comparison result. Then, the reliability counter 234 receives the lock/unlock counter signal, and increases or decreases the lock/unlock counter value based on the received lock/unlock counter signal. The reliability counter 234 also compares the accumulated lock/unlock counter value with a lock/unlock threshold value, and determines lock or unlock based on the comparison result.

The lock/unlock determined signal is inputted to the gain selector 222 of the symbol timing recovery unit through the lock controller 234, and the gain selector 222 controls the gain of the loop filter is controlled, thereby controlling a timing recovery loop bandwidth.

Dislike from the conventional timing lock detector shown in FIG. 2A, the conventional timing lock detector shown in FIG. 2B uses the average DC power value and the unit jitter power according to the channel state without using a fixed reference value. Therefore, the conventional timing lock detector can prevent lock detection error. However, the conventional timing lock detector of FIG. 2B also has problems as follows. The calculation of the average DC power value and the unit jitter power value requires high hardware cost as much as the calculation of variance in the timing lock detector in FIG. 2A. That is, the conventional timing lock detector shown in FIG. 2B dose not have any improvement in a view of the hardware cost.

Also, the lock/unlock threshold in the conventional timing lock detector of FIG. 2B can vary according to the channel state. Therefore, the timing lock detector of FIG. 2B still has the problem of the timing lock detector of FIG. 2A.

SUMMARY OF THE INVENTION

It is, therefore, an object of the present invention to provide to a timing lock detection apparatus and method for a digital broadcasting receiver, which reduces a hardware complexity, prevents a lock detection error, and quickly and accurately obtains convergence properties using a difference of timing error signals (ΔTiming_error) outputted from a loop filter of a symbol timing recovery unit to determine a converging level, that is a timing jitter signal.

In accordance with an aspect of the present invention, there is provided a timing lock detection apparatus in a digital broadcasting receiver, including: a discrete value generating unit for cyclically selecting a discrete signal value from a continuous timing error signal inputted from a loop filter of a symbol timing recovery unit; a differential calculating unit for obtaining a difference between the currently selected timing error signal value from the discrete value generating unit and a previously selected timing error signal that is a timing jitter signal; a sign variation detection unit for detecting variation in a sign of the timing jitter signal; a lock control signal generating unit for discriminating a period based on the detected sign changing time from the sign variation detection unit, and controlling a lock step of the loop filter according to a convergence mode of the timing jitter signal at each period; and a lock detection signal generating unit for generating a lock signal or an unlock signal according to whether the timing jitter signal reaches a steady state or not and using the current lock step signal.

In accordance with an aspect of the present invention, there is also provided a method of detecting a timing lock in a digital broadcasting receiver including the steps of: a) cyclically selecting a discrete signal value from a continuous timing error signal inputted from a loop filter of a symbol timing recovery unit; b) obtaining a difference between the currently selected timing error signal value and a previously selected timing error signal that is a timing jitter signal; c) detecting variation in a sign of the timing jitter signal; d) discriminating a period based on the detected sign changing time from the step c), and controlling a lock step of the loop filter according to a convergence mode of the timing jitter signal at each period; and e) generating a lock signal or an unlock signal according to whether the timing jitter signal reaches a steady state or not and using the current lock step signal.

BRIEF DESCRIPTION OF THE DRAWINGS

The above and other objects and features of the present invention will become better understood with regard to the following description of the preferred embodiments given in conjunction with the accompanying drawings, in which.

DETAILED DESCRIPTION OF THE INVENTION

Hereinafter, a timing lock detection apparatus and method for a digital broadcasting receiver in accordance with an embodiment of the present invention will be described in more detail with reference to the accompanying drawings.

Figure 3:
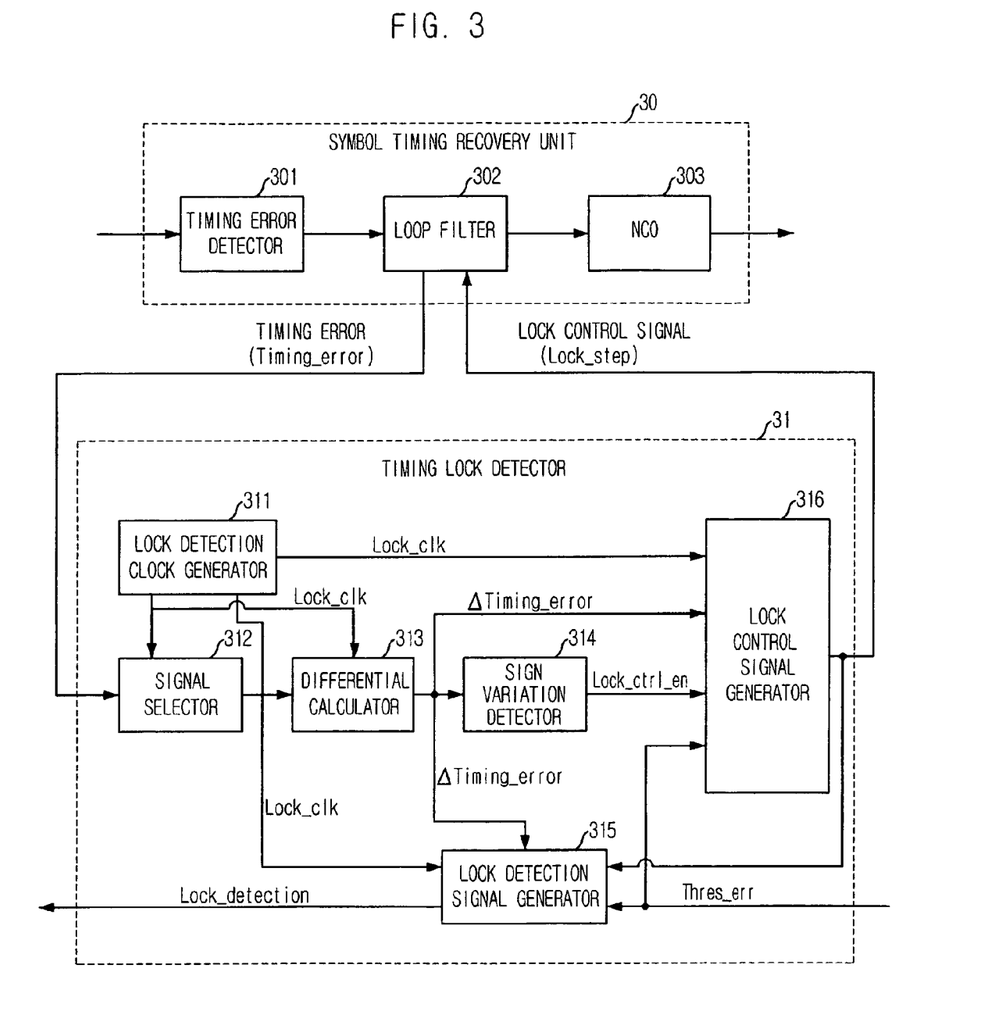
FIG. 3 is a block diagram illustrating a timing lock detection apparatus for a digital broadcasting receiver in accordance with an embodiment of the present invention.

FIG. 3 is a block diagram illustrating a timing lock detection apparatus for a digital broadcasting receiver in accordance with en embodiment of the present invention.

Figure 5A:
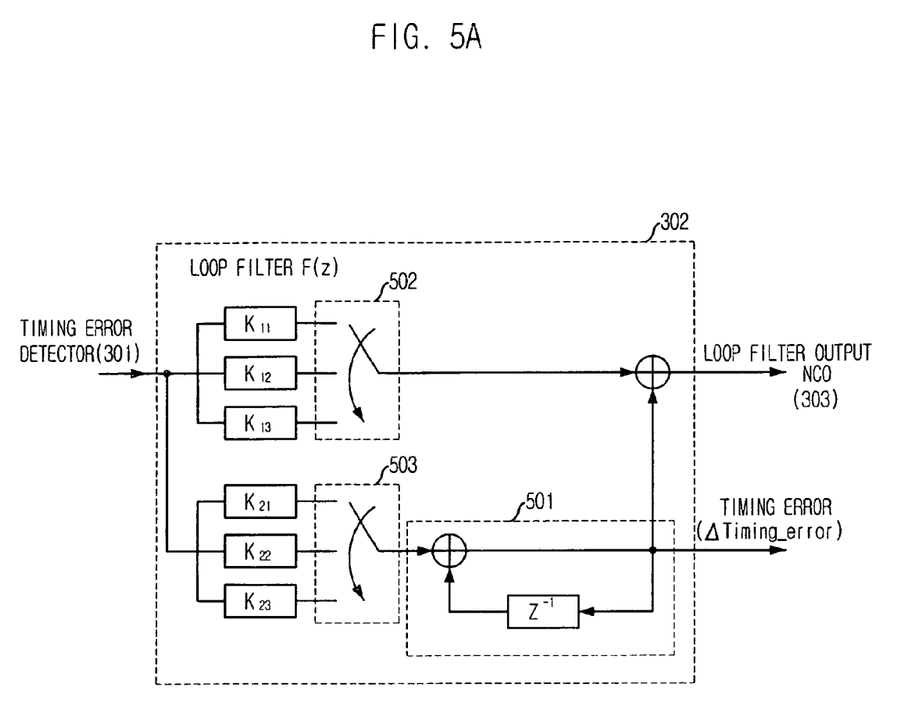
FIG. 5A is a block diagram of a loop filter 302 used in a symbol timing recovery unit of a digital broadcasting receiver in accordance with the related art.

Referring to FIG. 3, a timing recovery apparatus includes a symbol timing recovery unit 30 and a lock detection apparatus (or timing lock detector) 31. The symbol timing recovery unit 30 determines a timing recovery loop in a plurality of steps according to a converging level. The symbol timing recovery unit 30 includes a timing error detector 301, a loop filter 302 shown in FIG. 5, and an numerically controlled oscillator (NCO) 303. The lock detection apparatus 31 includes a lock detection clock generator 311, a signal selector 312, a differential calculator 313, a sign variation detector 314, a lock detection signal generator 315, and a lock control signal generator 316.

Hereinafter, each of constitutional elements of the lock detection apparatus 31 according to the present embodiment will be described.

The lock detection clock generator 311 generates a lock clock (Lock_clk) that is a clock for discontinuously driving the lock detection apparatus. The lock detection clock generator 311 creates a clock having an L symbol period, which becomes '1' at every L symbol period, suing a counter.

The signal selector 312 selects a timing error signal (Timing_error) outputted from the integrator of a loop filter 302 of the symbol timing recovery unit when the lock clock of the lock detection clock generator 311 becomes '1'. The selected timing error signal (Timing_error) becomes a discrete signal. That is, a block of the lock detection clock generator 311 and the signal selector 312 may be called a discrete value generating block.

The differential calculator 313 uses the lock clock of the lock detection clock generator 311 as an operating clock, and creates a timing jitter signal by obtaining a difference ΔTiming_error of the currently selected signal value and the previously selected and stored signal value. That is, the differential calculator 313 calculates the difference between the current timing error signal value and the previous timing error signal value.

The sign variation detector 314 extracts a sign of the timing jitter signal ΔTiming_error outputted from the differential calculator 313, detects the variation thereof, and generates a lock control enable signal (Lock_ctrl_en) which becomes '1' when a sign changes. That is, sign variation detector 314 detects the time of changing the timing jitter signal ΔTiming_error outputted from the differential calculator 313, and creates the lock control enable signal (Lock_ctrl_en).

Figure 4:
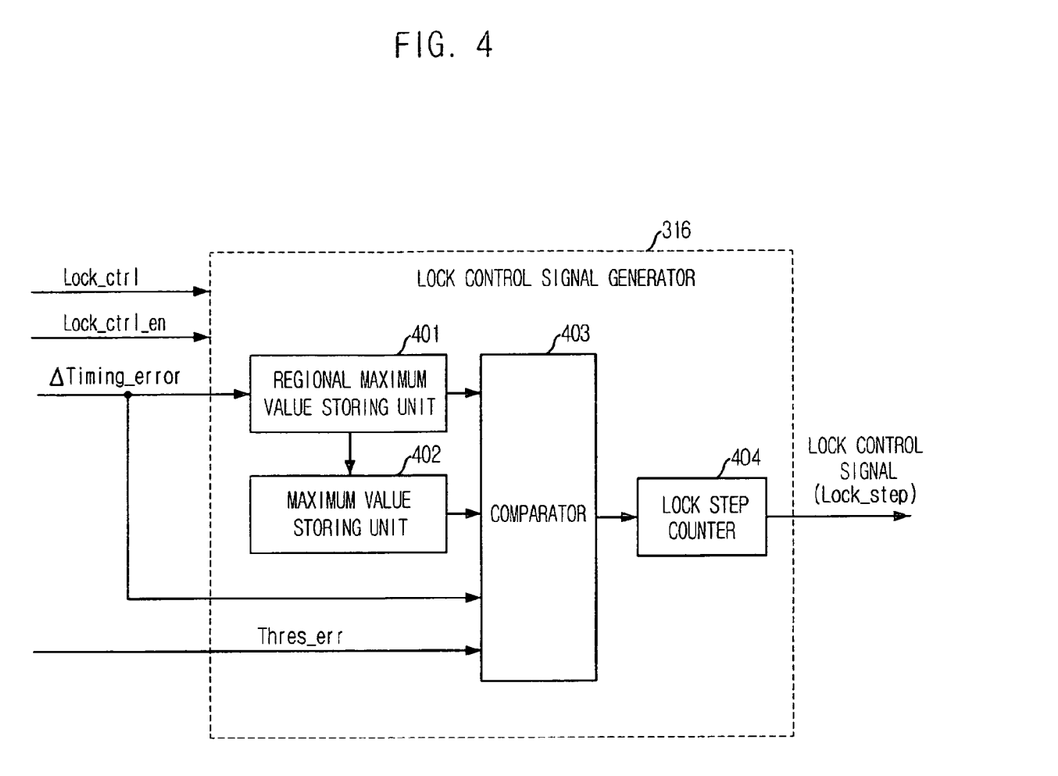
FIG. 4 is a block diagram illustrating a lock signal generator shown in FIG. 3 in accordance with an embodiment of the present invention.

The lock control signal generator 316 uses a lock clock (Lock_clk) as an operating clock, discriminates a period when the lock control enable signal (Lock_ctrl_en) becomes '1', and calculates a regional maximum value (tmp_max_err) and a maximum value (max_err) of a timing jitter signal (ΔTiming_error) in every periods. Herein, the regional maximum value (tmp_max_err) of the timing jitter signal period denotes a maximum timing jitter signal value at a corresponding period. That is, the maximum values are calculated and stored continuously through the comparator 403 when the lack control enable signal (Lock_ctrl_en) is not '1'. Then, when the lock control enable signal (Lock_ctrl_en) becomes '1', the calculated regional maximum value (tmp_max_err) is initialized to '0'.

The maximum value (max_err) of the timing jitter is obtained by comparing a previous maximum value and the maximum value of a current period and updating the maximum value before the maximum value of a current period is initialized to '0' when the lock control enable signal becomes '1'.

The lock control signal generator 316 creates a lock control signal, or lock step signal, (Lock_step) that increases or decreases a lock step counter value by comparing the maximum value (max_err) of a timing jitter signal and the regional maximum value (tmp_max_err) and comparing the timing jitter signal (ΔTiming_error) and a timing jitter threshold value. That is, the lock control signal generator 316 creates the lock control signal (Lock_step) using the lock control enable signal (Lock_ctrl_en) and the timing jitter signal.

The lock control signal generator 316 discriminates a period using the detected time of changing sign from the sign variation detector 314 and creates a lock control signal for controlling a lock step of the loop filter 302 according to a convergence mode of a timing jitter signal at every periods. It will be described in more detail with reference to FIG. 6 in later.

The lock detection signal generator 315 generates a lock signal or an unlock signal according to whether the steady state of a timing jitter signal is reached or not, and according to a current lock step state. More particularly, the lock detection signal generator 315 creates a lock detection signal such as a lock signal or a unlock signal using the lock control signal (Lock_step), the timing jitter signal (ΔTiming_error) and the timing jitter threshold.

That is, the lock detection signal generator 315 generates a lock signal if the timing jitter signal reaches to a steady state and if the current lock step is confirmed as a lock step maximum through the output of the lock control signal generator 316. Also, the lock detection signal generator 315 generates an unlock signal if the timing jitter signal does not reach to the steady state of the timing jitter signal and if the current lock step is not the lock step maximum although the timing jitter signal reaches to the steady state. It will be described in more detail with reference to FIG. 7.

FIG. 4 is a block diagram illustrating a lock signal generator shown in FIG. 3 in accordance with an embodiment of the present invention.

The lock control signal generator 316 includes a regional maximum value storing unit 401, a maximum value storing unit 402, and a lock step counter 404. The lock control signal generator 316 generates a lock control signal (Lock_step) using the maximum value (max_err) of a timing jitter signal, a regional maximum value (tmp_max_err), a timing jitter signal (ΔTiming_error) and a timing jitter threshold value.

The regional maximum storing unit 401 stores the maximum timing jitter signal value, that is, the regional maximum value, in every corresponding periods, and the maximum storing unit 402 stores the maximum timing jitter signal (maximum value) until the previous period.

The comparator 403 compares the regional maximum value and the maximum value at each period, reduces the lock step if the regional maximum value is lager. If the maximum value is larger, the absolute value of the timing jitter signal and the timing jitter threshold are compared. If the absolute value of the timing jitter signal is smaller, the comparator 403 increases the lock step, and if the timing jitter threshold value is smaller, the comparator 403 generates the control signal to sustain the current state of the lock step.

The lock step counter 404 generates a lock control signal (Lock_step) for controlling the lock step of a loop filter of a symbol timing recovery unit according to the control signal of the comparator 403.

Figure 5B:
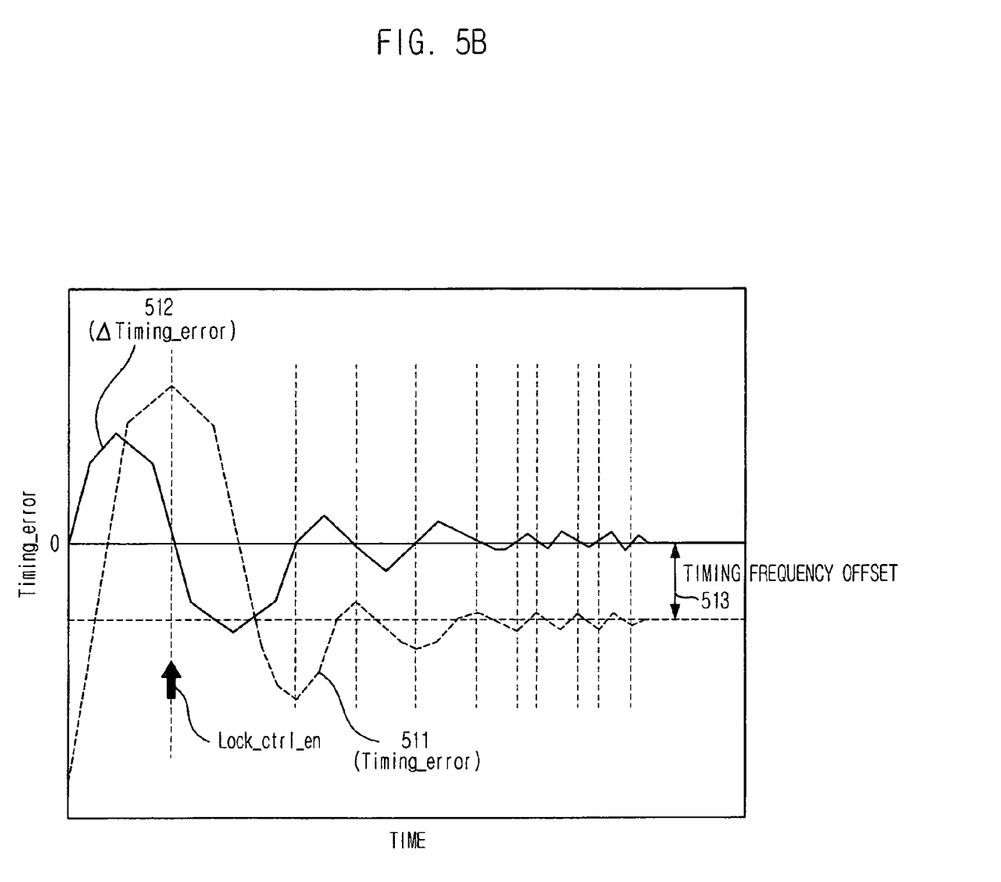
FIG. 5B is a diagram illustrating an operating principle of a lock detection apparatus in accordance with an embodiment of the present invention.

FIG. 5A is a block diagram of a loop filter 302 used in a symbol timing recovery unit of a digital broadcasting receiver in accordance with the related art, and FIG. 5B is a graph for describing an operating principle of a lock detection apparatus in accordance with an embodiment of the present invention.

The lock detection apparatus 31 receives a timing error signal, and switches 502 and 503 for selecting a gain of a loop filter are controlled by the lock control signal (Lock_step) inputted from the lock control signal generator 316 of the timing lock detection apparatus 31.

The output of the integrator 501 of the loop filter in FIG. 5A is converged to a timing frequency offset 513 in a steady state and obtains the effect corresponding to the average of the output of the timing error detector 301.

A dotted line 512 of a graph of FIG. 5B shows the converging property of the timing error signal 511. As shown, the convergence curve is gradually reduced in its period and amplitude as like a sine wave.

If the differential signal 512 of the timing error signal 511 is used in a view of the signal characteristics of the timing error signal 511 in which maximum values and minimum values are repeatedly shown while reducing its period, it can have the convergence property similar to the timing error signal 511 while the convergence value becomes '0'.

The differential signal of the timing error has an advantage as follows. Since the convergence value of the steady state is '0' in the differential signal 512 of the timing error, it dose not require to calculate an average value to obtain a variance as like the output signal of the timing error detector or the output signal of a loop filter. Also, it is not influenced by the channel characteristics. Since it does not require the average value to be calculated, it does not require the variance to use for obtaining the jitter element. It can be replaced with a simple absolute value. That is, since it is in proportional to a timing jitter in a steady state, the timing jitter value can be controlled by controlling the threshold value for detecting a lock signal.

The lock detection apparatus according to the present embodiment performs the timing lock detection based on the above described principle as follows.

Since a differential signal used in the present embodiment is greatly influenced by timing jitter, there is a large possibility to occur errors between adjacent symbols. In order to prevent the errors, a timing error of symbols separated at a predetermined period. In order to extract the timing error, the lock detection clock generator 311 generates a clock to cyclically make such a period using a counter. All operations of the lock detection apparatus 31 are performed based on the clock generated from the lock detection clock generator 311.

The signal selector 312 selects an input timing error signal according to the lock clock. Although it can be replaced with an average calculator, it must be an average calculator that calculates an average in a lock clock unit instead of a moving average calculator.

The differential calculator 313 stores the selected signal from the signal selector 312 at a memory and calculates a difference between a currently selected signal and a stored signal. For convenience, such a generated differential signal is called a timing jitter signal.

The sign variation detector 314 is a functional block for finding a zero crossing point described in the lock detection principle. The sign variation detector 314 outputs a lock control enable signal (Lock_ctrl_en).

The lock control signal generator 316 is a functional block that generates a lock control signal (Lock_step) for controlling a gain of a loop filter as shown in FIG. 5A. The lock control signal generator 316 performs the most important function.

Figure 6:
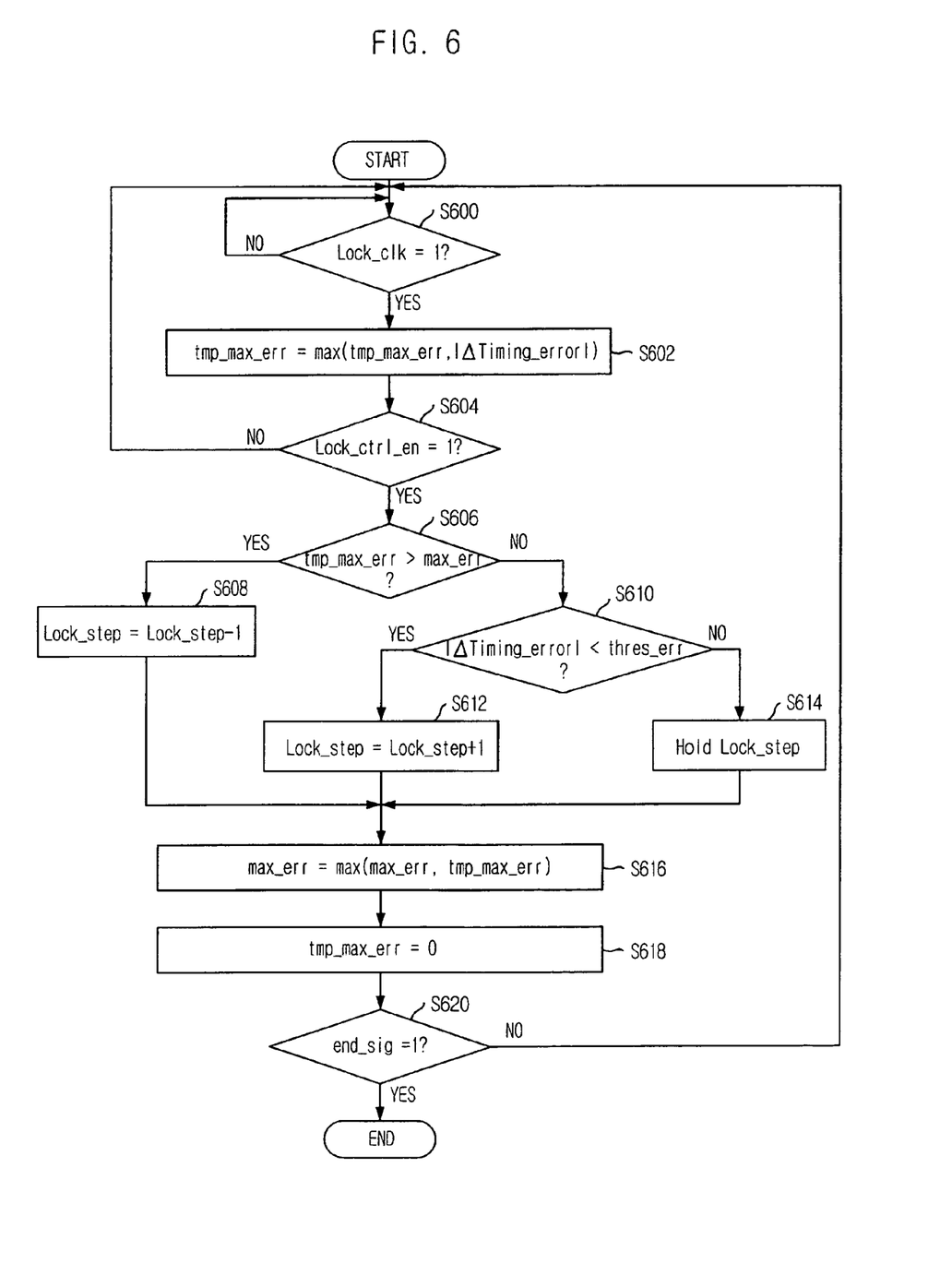
FIG. 6 is a flowchart illustrating a method of generating a lock control signal, which is applied to a lock control signal generator 316 of FIG. 3, in accordance with an embodiment of the present invention.

FIG. 6 is a flowchart illustrating a method of generating a lock control signal, which is applied to a lock control signal generator 316 of FIG. 3, in accordance with an embodiment of the present invention.

As shown in FIG. 5A, the loop gain is stored as a plurality of steps, $K_{11}$ and $K_{12}$. As the loop gain is greater, the lock step becomes smaller, and as the loop gain is smaller, the lock step becomes greater. That is, the loop step value is small at an initial stage after the symbol timing recovery unit 30 starts. Thus, a wide loop bandwidth is required at the initial stage. When the loop step value becomes larger after a predetermined time passes, the narrower loop bandwidth can be applied because it is getting close to the steady state.

The lock control signal generator 316 determines whether a current state is an initial acquisition state or a steady state. At the initial acquisition state, the lock control signal generator 316 reduces the lock step counter value to increase the bandwidth. At the later steady state, the lock control signal generator 316 increases the lock step counter value to reduce the bandwidth.

As shown in FIGS. 4 and 6, the lock control signal generator 316 uses the maximum value (max_err) among timing jitter signal absolute values and the regional maximum value (tmp_max_err) of the timing jitter signal absolute value (|?Timing_error|) in a period using a period discriminating signal for discriminating an acquisition mode and a tracking mode.

In case of the acquisition mode, the regional maximum value (tmp_max_err) is larger. The regional maximum value becomes smaller it is getting close to the tracking mode. Accordingly, when the lock control enable signal (Lock_ctrl_en) becomes '1' at step S604, the maximum value (max_err) and the regional maximum value (tmp_max_err) are compared at step S606. If the maximum value (max_err) is larger, the lock control signal generator 316 sets the acquisition mode and if not, it sets the tracking mode.

If the acquisition mode is set, the lock step count value is reduced at step S608 to increase the loop bandwidth. If the tracking mode is set, a timing jitter signal absolute value is compared to a timing jitter threshold (thres_err) at step S610 when the lock control enable signal becomes '1'. If the timing jitter threshold value (thres_err) is smaller, the loop bandwidth decreases by increasing the lock step count value at step S612 because it reaches to the steady state. If the timing jitter threshold value (thres_err) is smaller, the lock step is sustained to sustain the tracking speed at step S614 because it does not reach the steady state yet although it is the tracking mode.

Hereinafter, a method of generating a lock control signal, which is performed in the lock control signal generator 316, will be described with reference to FIG. 6.

Whenever the lock clock (Lock_clk) generated from the lock detection clock generator 311 becomes "1" at step S600, the absolute value (|?Timing_error|) of a timing jitter signal outputted from the differential calculator 313 is obtained. Then, the obtained absolute value is compared with the regional maximum value (tmp_max_err) in a corresponding period, thereby updating the regional maximum value (tmp_max_err) at step S602.

If the lock control enable signal (Lock_ctrl_en) outputted from the sign variation detector 314 is "1" at step S604, the regional maximum value (tmp_max_err) of a corresponding period is compared with the maximum value (max_err) until the previous period at step S606.

If the regional maximum value (tmp_max_err) is larger than the maximum value (max_err), the lock step count value is decreased at step S608.

If the regional maximum value (tmp_max_err) is not larger than the maximum value (max_err), the absolute value (|?Timing_error|) of the timing jitter signal is compared with the timing jitter threshold (thres_err). If the absolute value (|?Timing_error|) is smaller, the lock step count value increases at step S612. If not, the lock step count value is sustained at step S614.

Afterward, the maximum value (max_err) is updated with the larger one of the regional maximum value (tmp_max_err) and the maximum value (max_err) at step S616, and the regional maximum value (tmp_max_err) of a corresponding period is set to '0'. If an end signal is not '1' at step S620, the step S600 is performed for repeatedly performing the method for the next period. If the end signal is '1' at step S620, the lock control signal generation method is terminated.

Figure 7:
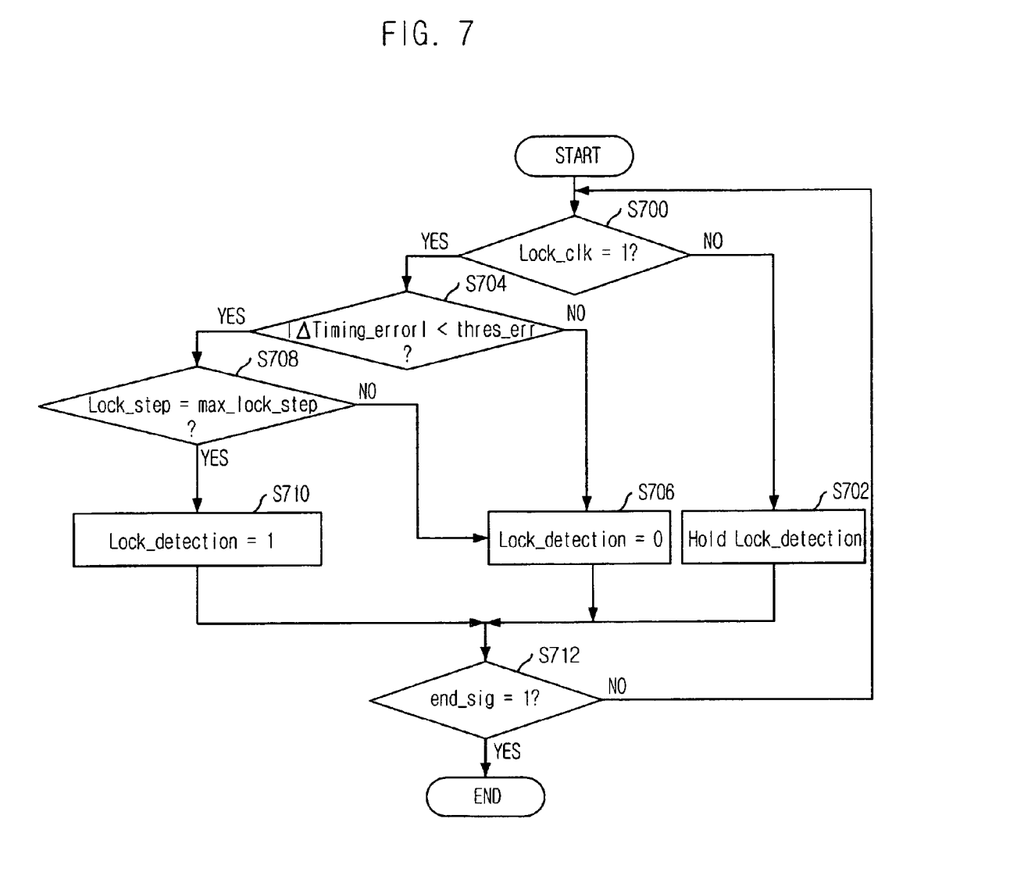
FIG. 7 is a flowchart illustrating a method of generating a lock detection signal, which is applied to a lock detection signal generator of FIG. 3, in accordance with an embodiment of the present invention.

FIG. 7 is a flowchart illustrating a method of generating a lock detection signal, which is applied to a lock detection signal generator of FIG. 3, in accordance with an embodiment of the present invention.

The lock detection signal generator 315 prevents the receiver performance from being degraded by noticing a synch acquisition time to elements in a rear end such as a carrier frequency recovery unit & channel equalizer 106.

As shown in FIG. 3, the lock detection signal generator 315 outputs an unlock signal if the absolute value of the timing jitter signal ((|?Timing_error|) is not smaller than the timing jitter threshold (thres_err) at step S704 and S706. If the absolute value of the timing jitter signal is smaller, the current lock step is confirmed at step S708.

If the current lock step state is the maximum step (max_lock_step), the lock detection signal generator 315 outputs a lock signal (Lock_detection=1). If not, the lock detection signal generator outputs an unlock signal (Lock_detection=0) at step S706.

If the lock clock (Lock_clk) is '0' at step S700, a stable signal is provided at step S702 by sustaining the previous state.

The above described steps are repeatedly performed until the end signal (end_sig) becomes '1'.

As described above, the present invention can be applied to recovery blocks for all types such as carriers or phases, which uses a phase locked loop in a broadcasting and communication receiver.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

As described above, the lock detection apparatus and method according to the present invention have advantages as follows.

At first, the lock detection apparatus and method according to the present invention do not require a multiplier, a divider and a memory for a squire operation and an accumulation operation because a timing error average and a variance are not calculated for detecting a timing lock in the present invention. Therefore, the hardware cost thereof can be abruptly reduced and it can be embodied with very simple structure.

Secondly, the lock detection apparatus and method according to the present invention uses a signal known as having a convergence value '0' at a steady state. Therefore, the influence of the channel is minimized because the signal dose not include any element influenced by the channel.

Thirdly, since the gain of the loop filter cannot change at every symbol, the conventional lock detect is operated for every symbols. The efficiency thereof is degraded. In the present invention, the unnecessary operations are reduced and the time for requiring the loop gain control is effectively detected because a zero crossing point is used in the present invention.

Fourthly, since the zero crossing point is used in the present invention, the acquisition mode and the tracking mode can be discriminated. Therefore, the loop gain can be effectively controlled, thereby obtaining fast and accurate convergence characteristics.

The present application contains subject matter related to Korean patent application Nos. 2005-0119958 and 2006-0091982, filed with the Korean patent office on Dec. 8, 2005, and Sep. 21, 2006, respectively, the entire contents of which being incorporated herein by reference.

While the present invention has been described with respect to certain preferred embodiments, it will be apparent to those skilled in the art that various changes and modifications may be made without departing from the spirits and scope of the invention as defined in the following claims.

What is claimed is:

1. A timing lock detection apparatus in a digital broadcasting receiver, comprising:
a discrete value generating means for cyclically selecting a discrete signal value from a continuous timing error signal inputted from a loop filter of a symbol timing recovery unit;
a differential calculating means for generating a timing jitter signal by obtaining a difference between the discrete signal value from the discrete value generating means and a previously selected timing error signal;
a sign variation detection means for detecting variation in a sign of the timing jitter signal;
a lock control signal generating means for discriminating a period based on the detected variation of the sign of the timing jitter signal from the sign variation detection means, and controlling a lock step of the loop filter according to a convergence mode of the timing jitter signal at each period; and
a lock detection signal generating means for generating a lock signal or an unlock signal according to whether the timing jitter signal reaches a steady state or not and using the lock step.

2. The timing lock detection apparatus as recited in claim 1, wherein the discrete generation means includes:
a lock clock means for generating a lock clock for operating the lock detection apparatus discontinuously; and
a signal selection means for selecting a signal value of a timing error signal continuously inputted from the loop filter when the lock clock is generated.

3. The timing lock detection apparatus as recited in claim 1, wherein the lock control signal generating means determines a convergence mode of the loop filter using a regional maximum value, a maximum value, and a timing jitter threshold, reduces a lock step of the loop filter if the convergence mode is the acquisition mode, increases the lock step if the convergence mode is a tracking mode with an abnormal state, and sustains a current lock step if the convergence mode is the tracking mode with a steady state, where the regional maximum value is a maximum timing jitter signal value in a corresponding period and the maximum value is the maximum timing jitter signal value until a predetermined period.

4. The timing lock detection apparatus as recited in claim 3, wherein the lock control signal generation means includes:
a regional maximum value storing means for storing the regional maximum value in the corresponding period at every periods;
a maximum value storing means for storing the maximum value until a previous period;
a comparing means for comparing the regional maximum value and the maximum value at every periods, reducing the lock step if the regional maximum value is larger than the maximum value, comparing an absolute value of the timing jitter signal and the timing jitter threshold if the regional maximum value is not larger than the maximum value, increasing the lock step if the absolute value is smaller, and sustaining the lock step if the absolute value is not smaller; and a lock step counter means for generating a lock control signal to control the lock step of the loop filter of the symbol timing recovery unit according to a control signal from the comparing means.

5. The timing lock detection apparatus as recited in claim 1, wherein the lock detection signal generation means generates the lock signal if the timing jitter signal reaches the steady state and if a current lock step is confirmed as a maximum through the output of the lock control signal generation means, and generates the unlock signal if the timing jitter signal does not reach the steady state and if the current lock step is not maximum.

6. The timing lock detection apparatus as recited in claim 5, wherein the lock detection signal generation means determines a steady state if an absolute value of the timing jitter signal is smaller than the timing jitter threshold value.

7. A method of detecting a timing lock in a digital broadcasting receiver comprising the steps of:
   a) cyclically selecting a discrete signal value from a continuous timing error signal inputted from a loop filter of a symbol timing recovery unit;
   b) generating a timing jitter signal by obtaining a difference between the currently selected discrete signal value from the continuous timing error signal and a previously selected timing error signal;
   c) detecting variation in a sign of the timing jitter signal;
   d) discriminating a period based on the detected sign changing time from the step c), and controlling a lock step of the loop filter according to a convergence mode of the timing jitter signal at each period; and
   e) generating a lock signal or an unlock signal according to whether the timing jitter signal reaches a steady state or not and using the lock step.

8. The method as recited in claim 7, wherein in the step d), a convergence mode of the loop filter is determined using a regional maximum value, a maximum value, and a timing jitter threshold, the lock step of the loop filter is reduced if the convergence mode is an acquisition mode, the lock step is increased if the convergence mode is a tracking mode with an abnormal state, and a current lock step is sustained if the convergence mode is the tracking mode with a steady state, where the regional maximum value is a maximum timing jitter signal value in a corresponding period and the maximum value is a the maximum timing jitter signal value until a predetermined period.

9. The method as recited in claim 8, wherein in the step d), the regional maximum value is compared with the maximum value, an acquisition mode is determined if the regional maximum value is larger than the maximum value, and a tracking mode is determined if the regional maximum value is not larger than the maximum value.

10. The method as recited in claim 7, wherein in the step e), the lock signal is generated if the timing jitter signal reaches a steady state and if a current lock step is maximum, and the unlock signal is generated if the timing jitter signal does not reach the steady state and if the current lock step is not maximum although the timing jitter signal reaches the steady state.

11. The method as recited in claim 8, wherein an absolute value of the timing jitter signal and the timing jitter threshold are compared, and the timing jitter signal is determined to reach the steady state if the absolute value of the timing jitter signal is smaller than the timing jitter threshold.

* * * * *